United States Patent [19]

Walter

[11] 4,380,273

[45] Apr. 19, 1983

[54] SPUR RACK HYDROSTEERING

[75] Inventor: Wolfgang Walter, Schwabisch Gmund, Fed. Rep. of Germany

[73] Assignee: Zahnradfabrik Friedrichshafen, AG., Friedrichshafen, Fed. Rep. of Germany

[21] Appl. No.: 174,555

[22] Filed: Aug. 1, 1980

[30] Foreign Application Priority Data

Aug. 1, 1979 [DE] Fed. Rep. of Germany ....... 2931184

[51] Int. Cl.³ .................. B62D 5/008; F16J 9/002
[52] U.S. Cl. ................... 180/132; 74/388 PS; 92/136; 92/167; 92/193; 277/188 R
[58] Field of Search ............. 180/132, 154, 155, 163, 180/79, 79.1, 79.3, 79.4, 79.5; 92/193, 195, 136, 167; 277/5, 103, 117, 177, 188 R; 74/388 PS

[56] References Cited

U.S. PATENT DOCUMENTS

| 2,218,719 | 10/1940 | Richards | 92/136 X |
| 3,632,121 | 1/1972 | Wahlmark | 277/188 R |
| 3,951,045 | 4/1976 | Frei et al. | 180/155 X |
| 4,275,641 | 6/1981 | Kopp | 92/136 X |

FOREIGN PATENT DOCUMENTS

| 2054798 | 2/1981 | United Kingdom | 92/136 |
| 733653 | 3/1943 | Fed. Rep. of Germany | 277/188 R |
| 736327 | 6/1943 | Fed. Rep. of Germany | 277/188 R |
| 1018866 | 2/1966 | United Kingdom | 277/188 R |

Primary Examiner—Joseph F. Peters, Jr.
Assistant Examiner—Mitchell J. Hill
Attorney, Agent, or Firm—Zalkind & Shuster

[57] ABSTRACT

A piston assembly is mounted at an inner axial end of the toothed portion of a rack within a tubular extension of a hydrosteering gear housing. The piston assembly includes a piston ring floatingly supported with axial clearance on the base portion of a mounting ring axially fixed to the rack at said inner axial end.

1 Claim, 2 Drawing Figures

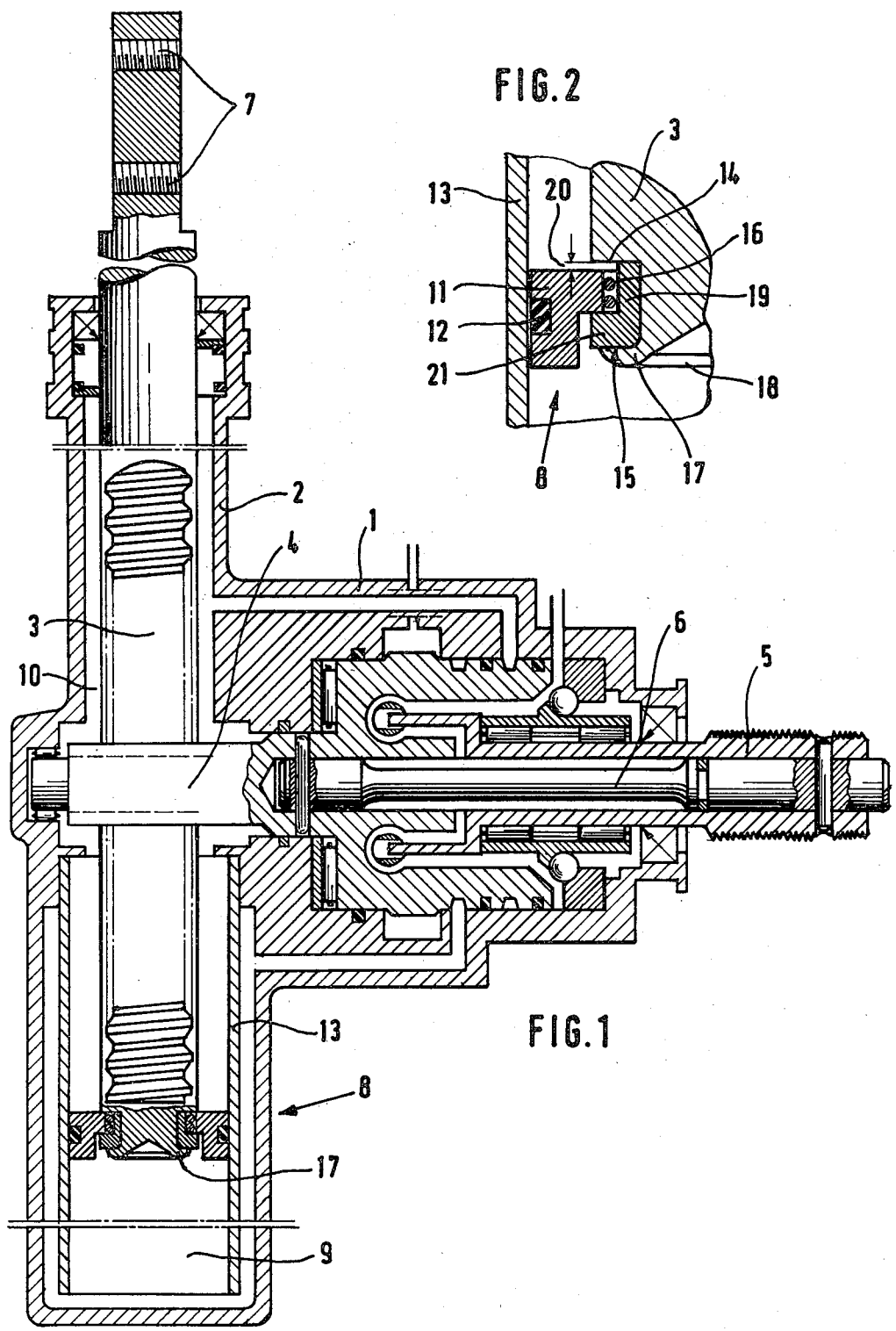

SPUR RACK HYDROSTEERING

BACKGROUND OF THE INVENTION

This invention relates to a hydrosteering device of the rack and pinion type adapted for use in automotive vehicles such as that disclosed in a prior copending application owned in common with the present application, now U.S. Pat. No. 4,275,641 to Kopp.

In a hydrosteering device of the foregoing type, a spur gear rack driven by a steering pinion is mounted by bearings in a steering gear housing. A piston ring having an outer annular seal and at least one radially inner elastic sealing ring resiliently mounting the piston ring in the rack, separate inner and outer pressure chambers within the housing. The toothed portion of the rack is disposed within the housing while the remaining portion of the rack extends through a cylindrical tube extension of the housing.

In such a hydrosteering device, the cylindrical tube extension serves as an operating piston chamber with a servo piston mounted on the rack to form inner and outer pressure spaces within the tube extension. One problem arising with such arrangements is the lack of a reliable piston seal because of misalignments and flexural moments. For this reason, an axially floating piston mounting has been proposed to balance out misalignments and flexural moments. Thus, the piston ring carrying the outer annular seal is connected to the rack through an elastic inner sealing ring. The piston ring is axially fixed to the rack by two snap rings. Therefore, the piston is not capable of absorbing large axial forces.

It is therefore an important object of the present invention to provide a rack and pinion type of hydrosteering device wherein misalignments and flexural moments are balanced out by an improved piston arrangement which also reduces space requirements.

SUMMARY OF THE INVENTION

In accordance with the present invention, the piston is mounted on a reduced diameter section of the rack by means of a mounting ring fitted up against a stop shoulder at the inner axial end of the toothed portion of the rack. The piston includes a piston ring assembled with axial clearance between the stop shoulder and a stop portion of the mounting ring projecting radially from a base portion on which an elastic sealing ring resiliently supports the piston ring for radial displacement. The mounting ring is firmly secured to the rack.

Because of the disposition of the piston at the inner axial end of the toothed portion of the rack, an axially shorter constructional arrangement is achieved. An inner pressure chamber is furthermore formed between one axial end of the cylindrical tube extension of the housing and the piston while the other chamber is formed as an annular space about the rack on the other axial side of the piston within the cylindrical tube. The piston therefore also acts as a stop to limit piston travel and steering movement. In such an arrangement, the piston absorbs large axial forces by means of the stop shoulder and the fastening of the piston mounting ring to the rack as compared to the use of clip rings in prior art arrangements. Also, the piston ring is supported floatingly in an axial direction by the inner elastic sealing ring on the base portion of the mounting ring to avoid axial jamming of the piston ring. Accordingly, the piston ring is not clamped between the stop portion of the mounting ring and the stop shoulder. The base portion is therefore provided with an axial dimension larger than the portion of the piston ring supported thereon by the inner sealing ring.

The piston is held assembled on the rack by axial clamping of the mounting ring thereto. In one embodiment of the invention, such clamping is effected by a rivet-shaped beading deformation of the inner axial end of the rack. Such deformation of the end of the rack is achieved by forming a large bore therein of such diameter leaving a relatively thin tubular wall over which the parts of the piston assembly are slidably assembled. The end of the rack may then be beaded over in the form of a rivet to securely clamp the piston assembly on the rack.

As a further feature of the invention, the stop and base portions of the mounting ring are formed from a common annular piece of angle-shaped cross-section with the axial dimension of the base portion being slightly greater than the axial thickness of the radially inner portion of the piston ring floatingly supported thereon. Such an arrangement simplifies the construction and furthermore assures appropriate axial clearance for axially floating support of the piston ring.

The axial stop shoulder cooperating with the piston assembly mounting as aforementioned is formed simply by reducing the diameter of the end portion of the rack axially beyond the rack teeth on which the mounting ring is clamped in place. The formation of an axial stop, could be effected in some other manner, by use of stop rings or stop pins on the rack, by way of example.

Also, other means for firmly fastening the mounting ring to the rack may be utilized such as the mounting of threaded rings and stop pins on the rack.

BRIEF DESCRIPTION OF DRAWING FIGURES

An embodiment of the invention will be explained hereinafter in greater detail with reference to the accompanying drawing, in which:

FIG. 1 shows a longitudinal section through a rack and pinion hydrosteering device constructed in accordance with the present invention.

FIG. 2 is an enlarged portion of the section view shown in FIG. 1.

DETAILED DESCRIPTION OF PREFERRED EMBODIMENT

Referring now to the drawing in detail, a hydrosteering device is shown including a steering gear housing 1 having a cylindrical extension 2. A spur gear rack 3 is mounted for axial displacement within the cylindrical extension 2 and is enmeshed with a steering pinion 4 journaled for rotation about an axis at right angles to the axis of the cylindrical extension. Mounted within the gear housing 1 is a steering control valve connected to the pinion 4 and forming part of a fluid control circuit for the hydrosteering system of a well known type which will therefore be described only briefly hereinafter. A manual steering force is applied to the steering control valve by means of a steering spindle 5 and torsion rod 6. The steering control valve is operative in response to the manual effort applied to the steering spindle to produce a fluid power assist in a manner already known in the art.

The spur gear rack has steering linkage attaching means 7 at one axial end externally of the cylindrical housing extension 2. A servo piston 8 is connected to the rack at its axial end internally of the cylindrical extension of the housing 1. As a result of this arrangement, an inner pressure space 9 and an opposed pressure space 10 are formed within the cylindrical extension. The inner pressure space 9 is limited only by the internal surface of the cylindrical extension 2 while the pressure space 10 is formed in annular relationship to the rack within the cylindrical extension 2. The piston 8 is connected to an inner axial end portion of the spur gear rack 3 axially beyond the rack teeth as more clearly shown in FIG. 2.

The piston 8 has a piston ring 11 carrying an outer sealing element 12 in wiping engagement with a guide tube 13 attached internally to the cylindrical extension 2 to thereby seal the pressure space 9 on one axial side of the piston from the pressure space 10 on the other axial side. A mounting ring 15 that is angle-shaped in cross-section is fitted onto the axial end portion of the spur gear rack 3 which is of a reduced diameter to form a stop shoulder surface 14. Two elastic sealing rings 16 are disposed between the mounting ring 15 and the piston ring 11 to form an elastic support means for floating support thereof. A radially inner base portion 19 of the ring 15 extends axially by a small amount beyond the adjacent portion of the piston ring 11. As a result of such dimensional relationship, there is sufficient axial clearance 20 for the piston ring 11 between a stop portion 21 of the ring 15 and the stop surface 14 as shown in FIG. 2 to accommodate movement of the piston ring all in an axial direction. Because of such axial clearance, misalignment and flexural moments occuring during operation are balanced out.

A rivet shaped bead formation 17 on the inner axial end of rack 3 holds the mounting ring 15 thereon. To obtain such rivet-shaped formation, the axial end portion of the rack is formed with a bore 18 of such diameter as to leave a radially thin tubular wall over which the piston parts are assembled before the rivet bead formation is produced in a customary and manner well known to those skilled in the art.

What is claimed is:

1. In a hydrosteering device having a housing (1), a rack (3) and a double-acting piston assembly (8) mounted on the rack, and means for sealing pressure spaces within the housing from each other on opposite axial sides of the piston assembly, the improvement comprising a stop surface (14) formed on the rack, a relatively rigid piston ring (11) exposed to pressures in both of said pressure spaces, mounting means (15,16) assembled on the rack for floating support of the piston ring with axial clearance (20) relative to said stop surface, and relatively flexible means (12) mounted on the piston ring for engagement with the housing in response to radially outward displacement of the piston ring by said pressures exerted thereon, said mounting means comprising a reduced diameter end portion on the rack extending axially from the stop surface, a mounting ring (15) having a stop portion (21) axially spaced from the stop surface, elastic support means (16) on the end portion of the rack axially between the stop surface and the stop portion for floating support of the piston ring, and fastening means (17) on the end portion of the rack for holding the mounting ring in axial abutment with the stop surface.

* * * * *